(12) United States Patent
Makowski et al.

(10) Patent No.: US 9,994,140 B2
(45) Date of Patent: Jun. 12, 2018

(54) FLOOR MAT WITH INTEGRAL HEEL BLOCKER

(71) Applicants: Matthew B. Makowski, Northville, MI (US); Echung Su, Rochester Hills, MI (US); Edward Joseph Abramoski, Canton, MI (US); Djamal Eddine Midoun, Ann Arbor, MI (US)

(72) Inventors: Matthew B. Makowski, Northville, MI (US); Echung Su, Rochester Hills, MI (US); Edward Joseph Abramoski, Canton, MI (US); Djamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 14/678,573

(22) Filed: Apr. 3, 2015

(65) Prior Publication Data

US 2016/0288685 A1    Oct. 6, 2016

(51) Int. Cl.
  *B60N 3/04*    (2006.01)
  *B60N 3/06*    (2006.01)
  *B60R 13/06*   (2006.01)

(52) U.S. Cl.
  CPC ............ *B60N 3/048* (2013.01); *B60N 3/044* (2013.01); *B60N 3/046* (2013.01); *B60N 3/06* (2013.01); *B60R 13/06* (2013.01)

(58) Field of Classification Search
  CPC .......... B60N 3/048; B60N 3/046; B60R 13/06
  USPC ...................................... 296/97.23
  See application file for complete search history.

(56) References Cited

U.S. PATENT DOCUMENTS

| 2,410,412 | A | * | 11/1946 | Hurford | ................... G05G 1/60 180/90.6 |
| 4,991,900 | A | * | 2/1991 | White | ................... B60N 3/044 296/75 |
| 6,224,133 | B1 | | 5/2001 | Abramoski et al. | |
| 6,502,905 | B2 | | 1/2003 | Cheris et al. | |
| 7,017,978 | B2 | * | 3/2006 | Murakami | ............. B60N 3/066 280/751 |
| 7,173,070 | B2 | * | 2/2007 | Koffler | ................... C08J 9/0061 521/134 |
| 7,316,847 | B2 | * | 1/2008 | MacNeil | ................. B60N 3/044 428/515 |
| 7,784,848 | B2 | * | 8/2010 | MacNeil | ............. B29C 47/0021 15/215 |

(Continued)

FOREIGN PATENT DOCUMENTS

| DE | 202011108028 U1 | 12/2011 |
| EP | 0410939 A1 | 1/1991 |
| WO | 2013120693 A1 | 8/2013 |

OTHER PUBLICATIONS

English machine translation of 202011108028DE.

*Primary Examiner* — Pinel E Romain
(74) *Attorney, Agent, or Firm* — Vichit Chea; King & Schickli, PLLC

(57) ABSTRACT

A floor mat is provided for a motor vehicle. The floor mat includes a debris pan and a debris retaining wall encompassing the debris pan. In addition, the floor mat includes an integral heel blocker within the debris retaining wall that is adapted to protect the feet, heels and lower legs of an operator of a motor vehicle in the event of a frontal collision.

10 Claims, 5 Drawing Sheets

(56) References Cited

U.S. PATENT DOCUMENTS

| | | | |
|---|---|---|---|
| 8,460,775 B2* | 6/2013 | Engelhardt | A47L 23/22 |
| | | | 15/215 |
| 8,778,480 B2 | 7/2014 | Bouchard et al. | |
| 9,126,636 B2* | 9/2015 | Ikeno | B60R 21/04 |
| 2010/0212119 A1* | 8/2010 | Dendo | B60N 3/046 |
| | | | 24/453 |
| 2010/0263469 A1 | 10/2010 | Ohtsubo et al. | |
| 2011/0159230 A1* | 6/2011 | Goode | B60N 3/042 |
| | | | 428/92 |
| 2013/0136899 A1* | 5/2013 | Milella, Jr. | B60N 3/048 |
| | | | 428/172 |

* cited by examiner

FLOOR MAT WITH INTEGRAL HEEL BLOCKER

TECHNICAL FIELD

This document relates generally to the field of motor vehicle accessories and, more particularly, to a floor mat incorporating an integrated heel blocker.

BACKGROUND

A heel blocker is a device to protect the feet, heels and lower legs of an operator of a motor vehicle in the event of an accident. More specifically, the heel blocker facilitates better engagement between the knee and knee bolster thereby improving lower leg and femur loading as well as kinematics by limiting heel travel into the toe pan area forward of the vehicle foot pedals. Thus, the heel blocker effectively manages the forces associated with an accident such as a head on or offset frontal collision.

In the past, a wedge shape heel blocker H has been provided underneath the vehicle control pedals P sandwiched between the carpet C and the insulation layer I overlying the floor F of the motor vehicle (see FIGS. 1a and 1b). While this arrangement is effective for providing enhanced lower leg safety for the vehicle operator, it effectively restricts a floor mat M from extending forward underneath the control pedals P including particularly the gas pedal GP. As a consequence, dirt and debris has a tendency to collect on the carpet C of the vehicle forward of the front edge E of the floor mat M. Thus, the carpet C has a tendency to be stained by water and salt associated with inclement weather to the dissatisfaction of the vehicle owner.

This document relates to a new and improved floor mat which incorporates an integrated heel blocker. Such a floor mat eliminates the need to provide a heel blocker beneath the carpet C of the motor vehicle and consequently allows the floor mat to extend forward underneath the control pedals P of the vehicle including the gas pedal GP. In this configuration, the floor mat is effective in catching dirt and debris underneath the control pedals and preventing staining and soiling of the vehicle carpet in inclement weather conditions to the dissatisfaction of the vehicle owner. Further, this is accomplished without compromising the safety benefits provided by a heel blocker.

SUMMARY

In accordance with the purposes and benefits described herein, a floor mat is provided for a motor vehicle. The floor mat comprises a debris pan, a debris retaining wall encompassing the debris pan and a heel blocker within the debris retaining wall. A fastener secures the floor mat in position on a floor of the motor vehicle.

In one possible embodiment, the fastener includes a clip that is received through a grommet in the debris pan. Further, a clip receiver is provided in an underlying carpet of the motor vehicle. That clip receiver receives and engages the clip to hold the floor mat in position on the floor of the motor vehicle with the heel blocker underlying the control pedals of the motor vehicle.

Still further, the heel blocker includes a profile that rises toward a forward edge of the floor mat. In any of the embodiments, the heel blocker may be integrally formed with the debris pan and the debris retaining walls from a resilient and waterproof material such as rubber.

In accordance with an additional aspect, a motor vehicle is also provided incorporating the floor mat described.

In accordance with yet another aspect, a method is provided for protecting the lower leg of the vehicle operator from injury in the event of a frontal collision. That method may be broadly described as comprising the step of positioning a floor mat with an integral heel blocker on a floor of the motor vehicle with the integral heel blocker underlying the control foot pedals of that vehicle.

Still further, the method may include securing the floor mat in position on the floor of the motor vehicle overlying a carpet of the motor vehicle. Further, the method may include providing the floor mat with a debris pan and a debris retaining wall encompassing the debris pan. Still further, the method may include providing the heel blocker within the debris retaining wall.

In the following description, there are shown and described several preferred embodiments of the floor mat. As it should be realized, the floor mat is capable of other, different embodiments and its several details are capable of modification in various, obvious aspects all without departing from the floor mat as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the floor mat and together with the description serve to explain certain principles thereof. In the drawing figures:

FIG. 1b is a schematic side elevational view illustrating the structures illustrated in FIG. 1a.

Reference will now be made in detail to the present preferred embodiments of the floor mat, examples of which are illustrated in the accompanying drawing figures.

DETAILED DESCRIPTION

Figure 2:
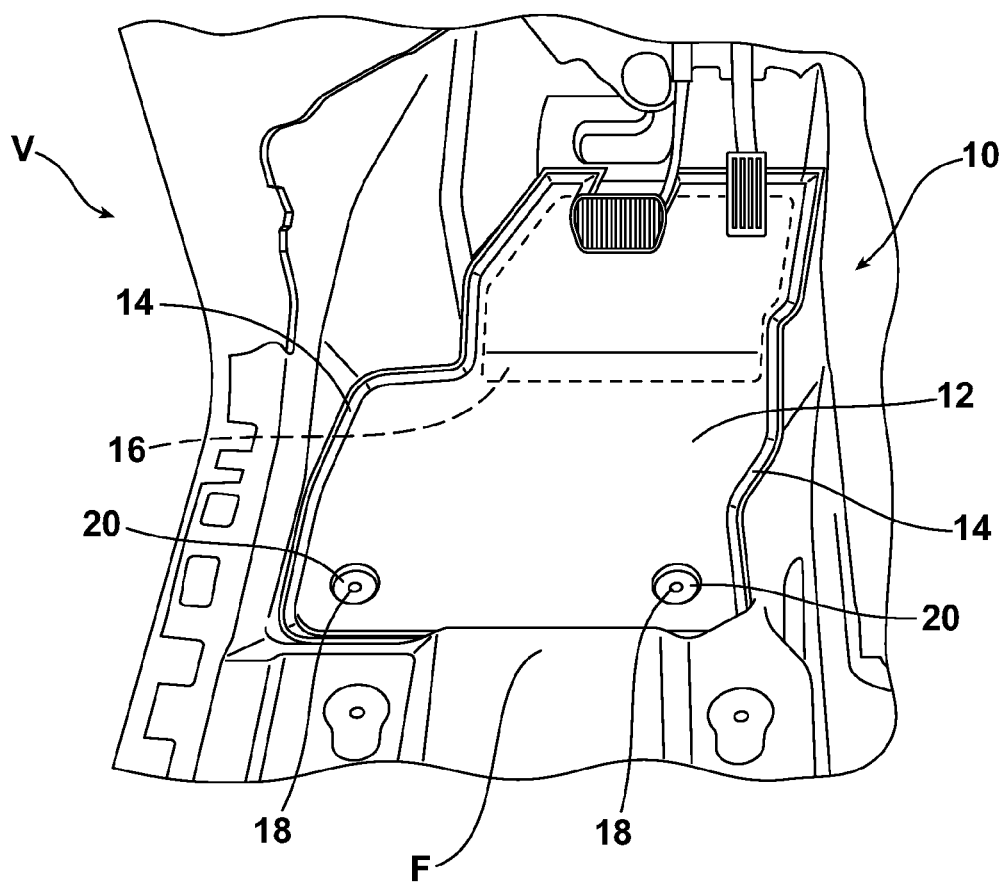
FIG. 2 is a perspective view of the current floor mat with an integrated heel blocker overlying the carpet of the motor vehicle and extending underneath the vehicle control foot pedals including the gas pedal.
Figure 3:
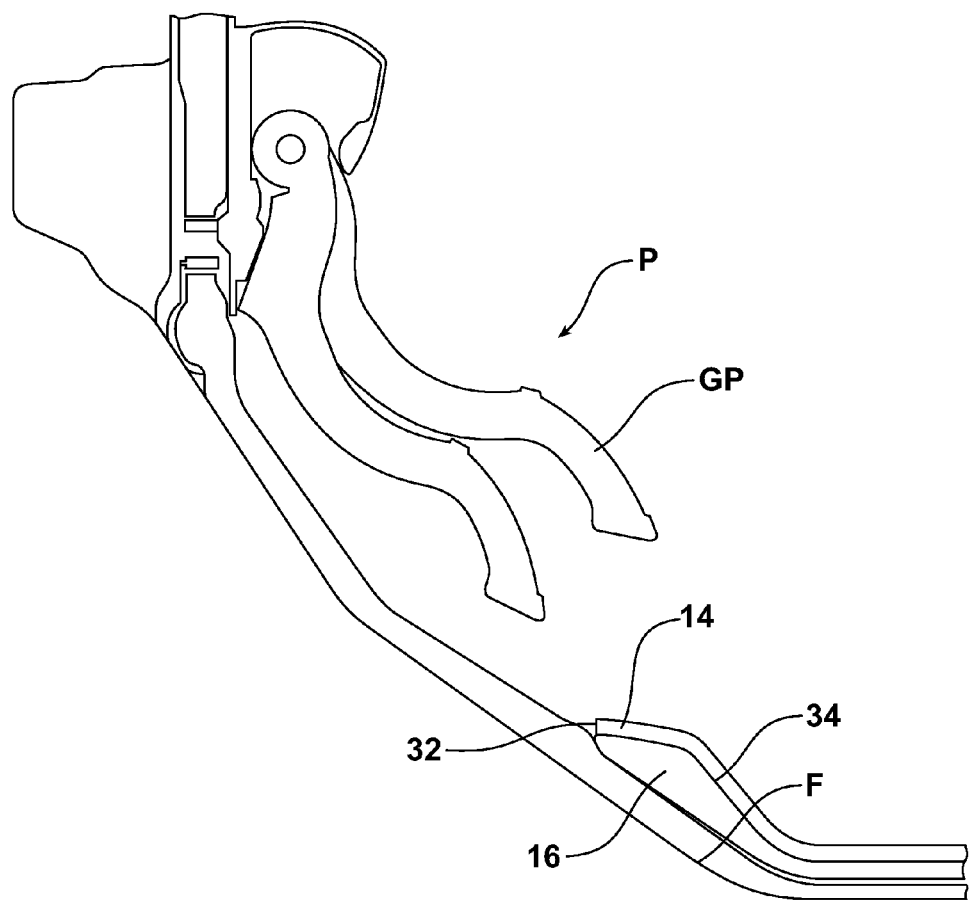
FIG. 3 is a detailed schematic section view illustrating how the integral heel blocker of the floor mat underlies the gas pedal of the vehicle.
Figure 4:
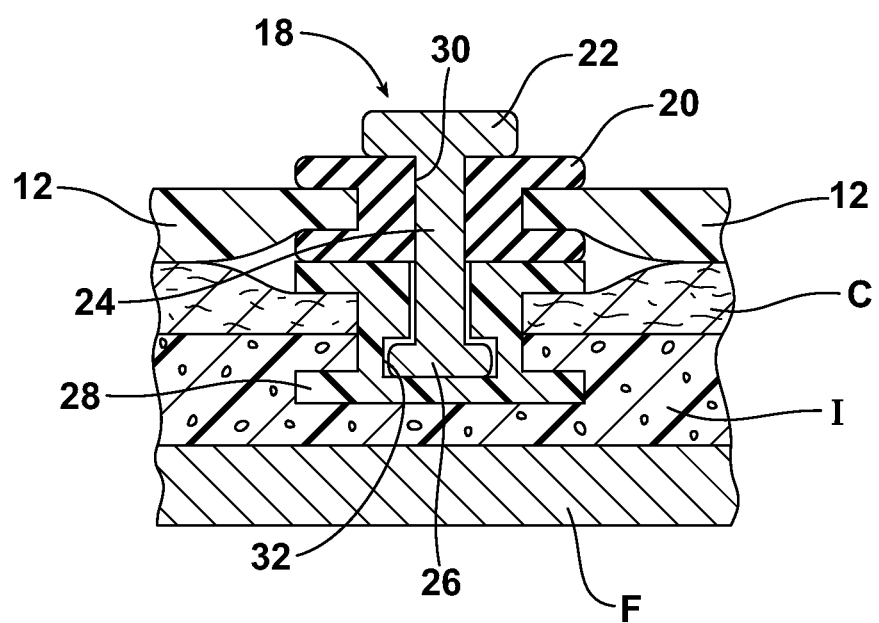
FIG. 4 is a schematic cross-sectional view illustrating the fastening of the floor mat to the underlying carpet of the motor vehicle.

Reference is now made to FIG. 2-4 illustrating the floor mat 10 for a motor vehicle that is the subject matter of this document. In the illustrated embodiment, the floor mat 10 comprises a single piece body including a debris pan 12, a debris retaining wall 14 encompassing the entire perimeter of the debris pan and a heel blocker 16 within the debris retaining wall.

In one possible embodiment, the heel blocker 16 is integrally formed with the debris pan 12 and the debris retaining wall 14 from a resilient and waterproof material. One appropriate material for this purpose is rubber.

As best illustrated in FIGS. 2 and 4, the floor mat 10 further includes a fastener 18 that secures the floor mat 10 in position on the floor F of the motor vehicle V. In the illustrated embodiment, the fastener 18 comprises a clip that is received through a grommet 20 that holds the debris pan 12 and seals against the debris pan to prevent water intrusion and potential leaks of debris and fluid from the debris pan to the underlying carpet. As further illustrated, the fastener 18 includes a head end 22, a shaft 24 and a cooperating locking lug 26.

As further illustrated in FIG. 4, the floor mat 10 also includes a clip receiver 28 that is mounted in and secured to the motor vehicle carpet C overlying the layer of insulation I. The clip receiver 28 includes an oblong-in-cross-section central bore 30. The floor mat 10 is secured to the floor F of the vehicle V overlying the carpet C by aligning the clip 18 with the oblong central bore 30 and inserting the clip into the central bore. When fully seated, the clip 18 is twisted at 90° so that the locking lug 26 locks in the undercut channel 32 of the clip receiver 28 and the floor mat 10 is securely held in position with heel blocker 16 underlying the control pedals, including, particularly, the gas pedal GP of the motor vehicle. See particularly FIGS. 2 and 3.

As best illustrated in FIG. 3, the heel blocker 16 includes a profile that rises toward a forward edge 32 of the floor mat 10. In the event of a frontal collision, the heels of the vehicle operator are forced against the face 34 of the heel blocker 16 which compresses slightly to absorb energy generated during the accident but prevents forward intrusion of the operator feet under the control pedals P while also facilitating better engagement between the knee and knee bolster of the motor vehicle thereby improving lower leg and femur loading as well as kinematics for additional safety.

As should be appreciated from the above description, the floor mat 10 facilitates a method of providing lower leg injury protection for an operator of a motor vehicle. That method may be broadly described as comprising the step of positioning the floor mat 10 with the integrated heel blocker 16 on a floor F of the motor vehicle V with the integral fuel blocker underlying the control foot pedals P of the vehicle. Further, the method includes securing a floor mat 10 in position on the floor F of the motor vehicle V overlying the carpet C of the motor vehicle. In addition, the method includes providing the floor mat 10 with the debris pan 12 and the debris retaining wall 14 encompassing the debris pan. This ensures that dirt and debris is collected and maintained in the debris pan 12 thereby protecting the underlying carpet C from soiling and staining.

Figure 1A:
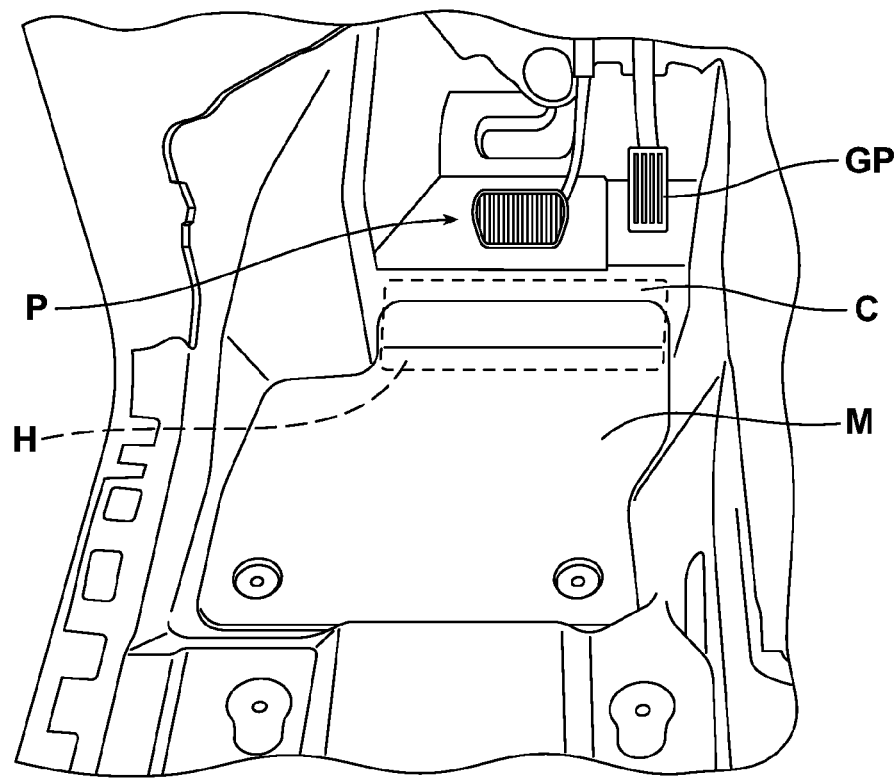
FIG. 1a is a perspective view of the interior of the floor area in front of the vehicle operator showing a vehicle with a heel blocker underneath the carpet of the motor vehicle and a prior art floor mat positioned over that carpet.
Figure 1B:
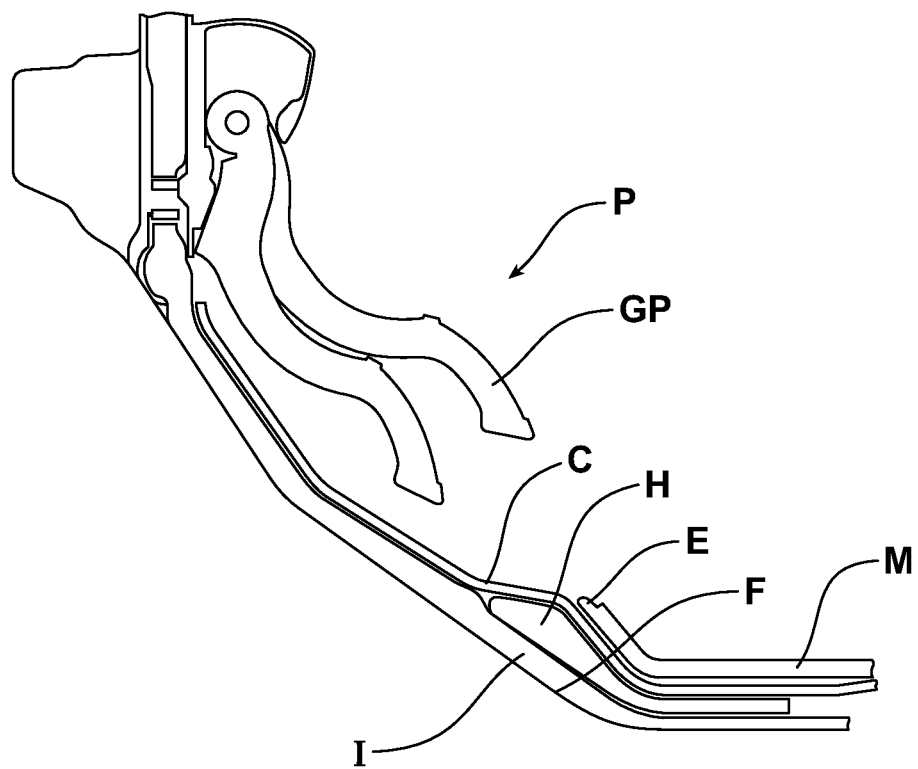

The heel blocker 16 is also provided within the debris retaining wall 14. As illustrated in FIG. 3, the debris retaining wall 14 extends to the forward edge 32 of the floor mat 10 functioning as a raised lip to prevent dirt and debris from collecting on the carpet C in front of the floor mat thereby overcoming a problem characteristic of prior art floor mat designs which could not extend forward enough to catch all the debris because of the existence of a heel blocker H beneath the carpet C (note FIGS. 1a and 1b). Advantageously, since the floor mat 10 incorporates an integral heel blocker 16, the need to provide a heel blocker H under the carpet C is eliminated and a better functioning and more effective floor mat 10 is provided without compromising operator safety.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A floor mat for a motor vehicle, comprising:
    a fastener that secures said floor mat in position on a floor of the motor vehicle;
    a debris pan;
    a debris retaining wall encompassing said debris pan; and
    a wedge shape heel blocker within said debris retaining wall underlying control foot pedals of the motor vehicle.

2. The floor mat of claim 1, wherein said fastener includes a clip that is received through a grommet in said debris pan.

3. The floor mat of claim 2, further including a clip receiver in an underlying carpet of the motor vehicle that receives and engages said clip to hold said floor mat in position on said floor of the motor vehicle with said heel blocker underlying control foot pedals of the motor vehicle.

4. The floor mat of claim 3, wherein said heel blocker includes a profile that rises toward a forward edge of said floor mat.

5. The floor mat of claim 1, wherein said heel blocker includes a profile that rises toward a forward edge of said floor mat.

6. The floor mat of claim 1, wherein said heel blocker is integrally formed with said debris pan and said debris retaining wall from a resilient and waterproof material.

7. The floor mat of claim 6, wherein said resilient and waterproof material is rubber.

8. A method of providing lower leg injury protection for an operator of a motor vehicle, comprising:
    positioning a floor mat with an integral wedge shape heel blocker on a floor of the motor vehicle with said integral heel blocker underlying control foot pedals of said vehicle; and
    securing said floor mat in position on the floor of the motor vehicle overlying a carpet of the motor vehicle.

9. The method of claim 8, including providing said floor mat with a debris pan and a debris retaining wall encompassing said debris pan.

10. The method of claim 9, including providing said heel blocker within said debris retaining wall.

* * * * *